US012811323B2

(12) United States Patent
Raybold

(10) Patent No.: US 12,811,323 B2
(45) Date of Patent: Nov. 24, 2026

(54) CONNECTOR FOR A FLAT FLEXIBLE CABLE

(71) Applicant: TE Connectivity Solutions GmbH, Schaffhausen (CH)

(72) Inventor: Christopher Ryan Raybold, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 341 days.

(21) Appl. No.: 18/391,862

(22) Filed: Dec. 21, 2023

(65) Prior Publication Data

US 2025/0210896 A1 Jun. 26, 2025

(51) Int. Cl.
*H01R 12/00* (2006.01)
*H01R 12/77* (2011.01)

(52) U.S. Cl.
CPC ......... *H01R 12/774* (2013.01); *H01R 12/778* (2013.01)

(58) Field of Classification Search
CPC .... H01R 12/774; H01R 12/778; H01R 12/69; H01R 12/79
See application file for complete search history.

(56) References Cited

U.S. PATENT DOCUMENTS

2004/0029441 A1* 2/2004 Wu .................... H01R 12/7058 439/574
2004/0043658 A1* 3/2004 Ko ....................... H01R 12/714 439/607.56
2005/0009398 A1* 1/2005 Beer ...................... H01R 12/79 439/495
2006/0046559 A1* 3/2006 Shino ................... H01R 12/775 439/494
2008/0261422 A1* 10/2008 Hanyu ................. H01R 12/774 439/153
2009/0191754 A1* 7/2009 Mase ................. H01R 13/4361 439/598
2010/0009572 A1* 1/2010 Lei ..................... H01R 13/6581 439/626
2010/0035443 A1* 2/2010 Daily ................... H01R 12/721 439/59
2010/0151716 A1* 6/2010 Suzuki ................. H01R 12/771 439/260
2010/0227511 A1* 9/2010 Qian ........................ H01R 9/03 439/708
2012/0077385 A1* 3/2012 Qiao ...................... H01R 24/62 439/628
2017/0338582 A1* 11/2017 Cheng .................. H01R 13/516
2021/0376516 A1* 12/2021 Zhang .................. H01R 12/724

* cited by examiner

*Primary Examiner* — Abdullah A Riyami
*Assistant Examiner* — Nelson R. Burgos-Guntin

(57) ABSTRACT

A connector includes a housing and a locking device disposed in the housing. The housing has a body defining a body receiving space, a divider positioned in the body receiving space and defining a plurality of terminal receiving passageways with the body in a plurality of rows, and a latch extending from the body. The locking device has a base and a plurality of protrusions extending from the base. Each of the protrusions is received in one of the rows in an open position of the locking device and is inserted further into the terminal receiving passageways in a closed position of the locking device. The latch engages the locking device to secure the locking device in each of the open position and the closed position.

20 Claims, 8 Drawing Sheets

CONNECTOR FOR A FLAT FLEXIBLE CABLE

FIELD OF THE INVENTION

The present invention relates to a connector and, more particularly, to a connector for a flat flexible cable.

BACKGROUND

Flat flexible cables (FFCs) or Flexible Printed Circuits (FPC) are electrical components consisting of at least one conductor (e.g., a metallic foil conductor) embedded within a thin, flexible strip of insulation. Flat flexible cables are gaining popularity across many industries due to advantages offered over their traditional "round wire" counterparts. Specifically, in addition to having a lower profile and lighter weight, FFCs enable the implementation of large circuit pathways with significantly greater ease compared to round wire-based architectures. As a result, FFCs are being considered for many complex and/or high-volume applications, including wiring harnesses, such as those used in automotive manufacturing.

The implementation or integration of FFCs into existing wiring environments is not without significant challenges. In an automotive application, by way of example only, an FFC-based wiring harness would be required to mate with perhaps hundreds of existing components, including sub-harnesses and various electronic devices (e.g., lights, sensors, etc.), each having established, and in some cases standardized, connector or interface types. Accordingly, a critical obstacle preventing the implementation of FFCs into these applications includes the need to develop quick, robust, and low resistance termination techniques which enable an FFC to be connectorized for mating with these existing connections.

SUMMARY

A connector includes a housing and a locking device disposed in the housing. The housing has a body defining a body receiving space, a divider positioned in the body receiving space and defining a plurality of terminal receiving passageways with the body in a plurality of rows, and a latch extending from the body. The locking device has a base and a plurality of protrusions extending from the base. Each of the protrusions is received in one of the rows in an open position of the locking device and is inserted further into the terminal receiving passageways in a closed position of the locking device. The latch engages the locking device to secure the locking device in each of the open position and the closed position.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
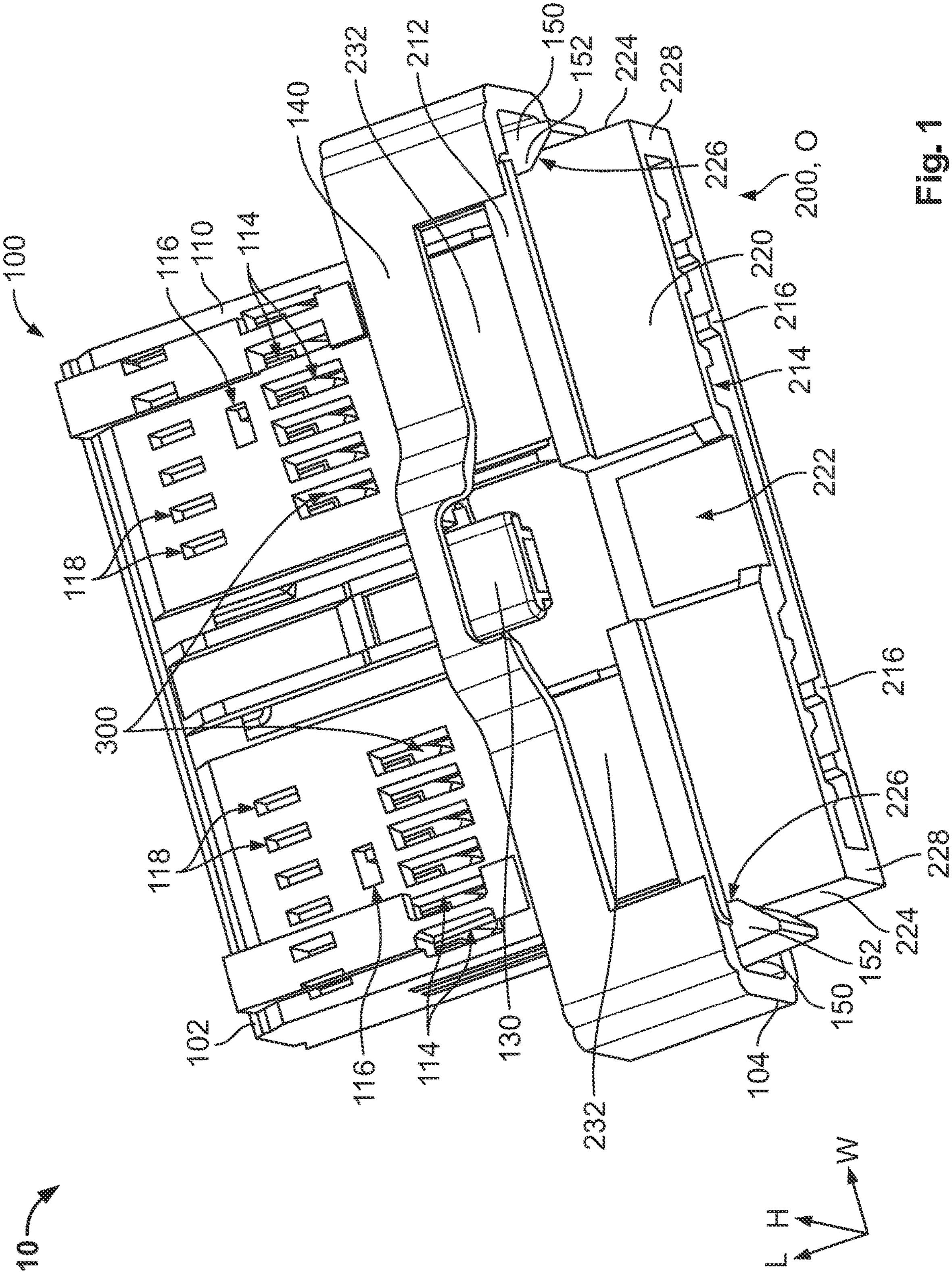
FIG. 1 is a perspective view of a connector according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as "longitudinal", "width", and "height". These descriptors are merely for clarity of the description and for differentiation of the various directions. These directional descriptors do imply or require any particular orientation of the disclosed elements.

Throughout the drawings, only one of a plurality of identical elements may be labeled in a figure for clarity of the drawings, but the detailed description of the element herein applies equally to each of the identically appearing elements in the figure.

A connector 10 according to an embodiment is shown in FIG. 1. The connector 10 includes a housing 100, a locking device 200 removably positioned in the housing 100, a plurality of terminals 300 disposed in the housing 100, and a plurality of flat flexible cables (FFCs) 400, shown in FIGS. 6 and 7, positioned in the housing 100 and the locking device 200 and connected to the terminals 300.

Figure 2:
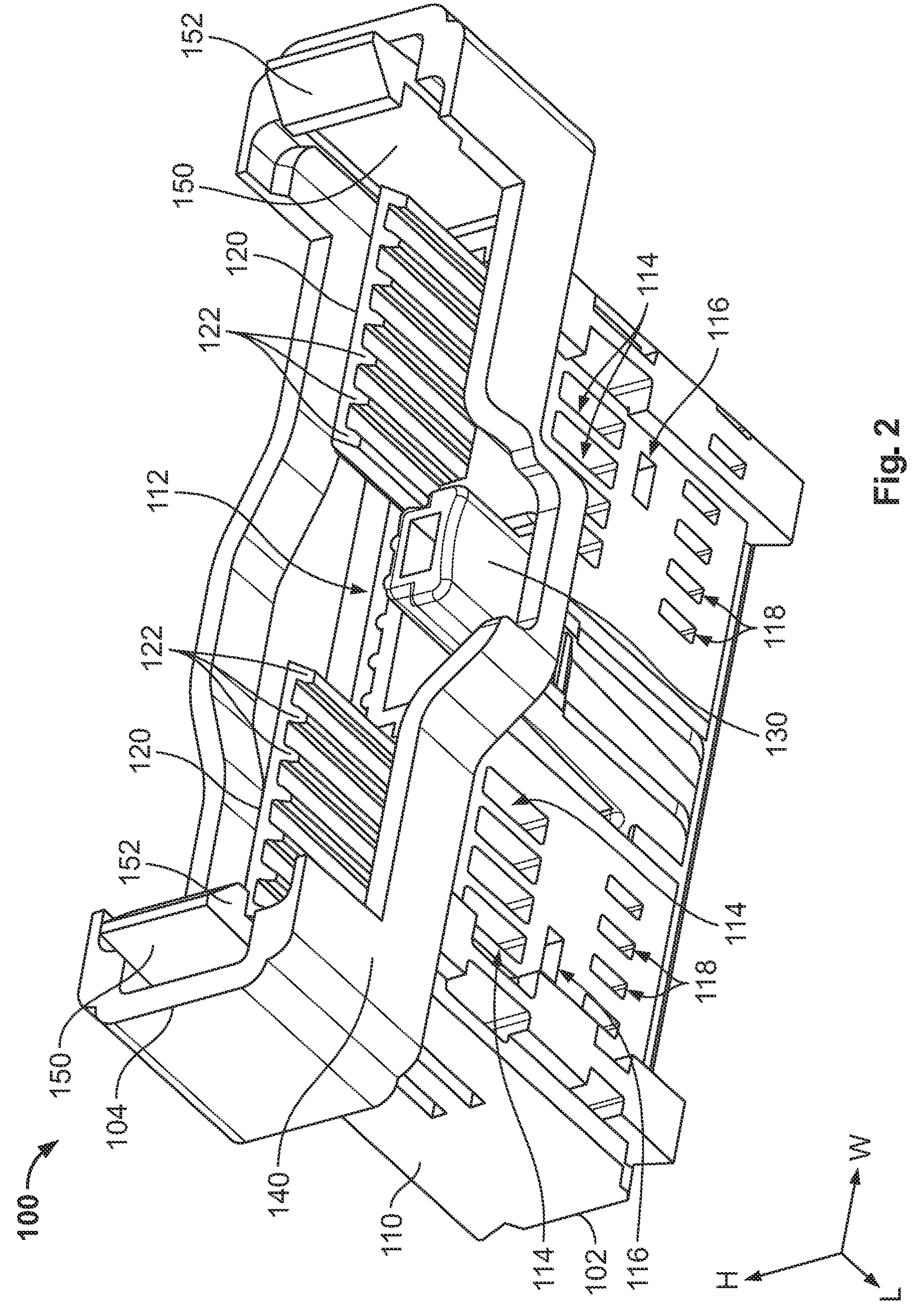
FIG. 2 is a perspective view of a housing of the connector.
Figure 4:
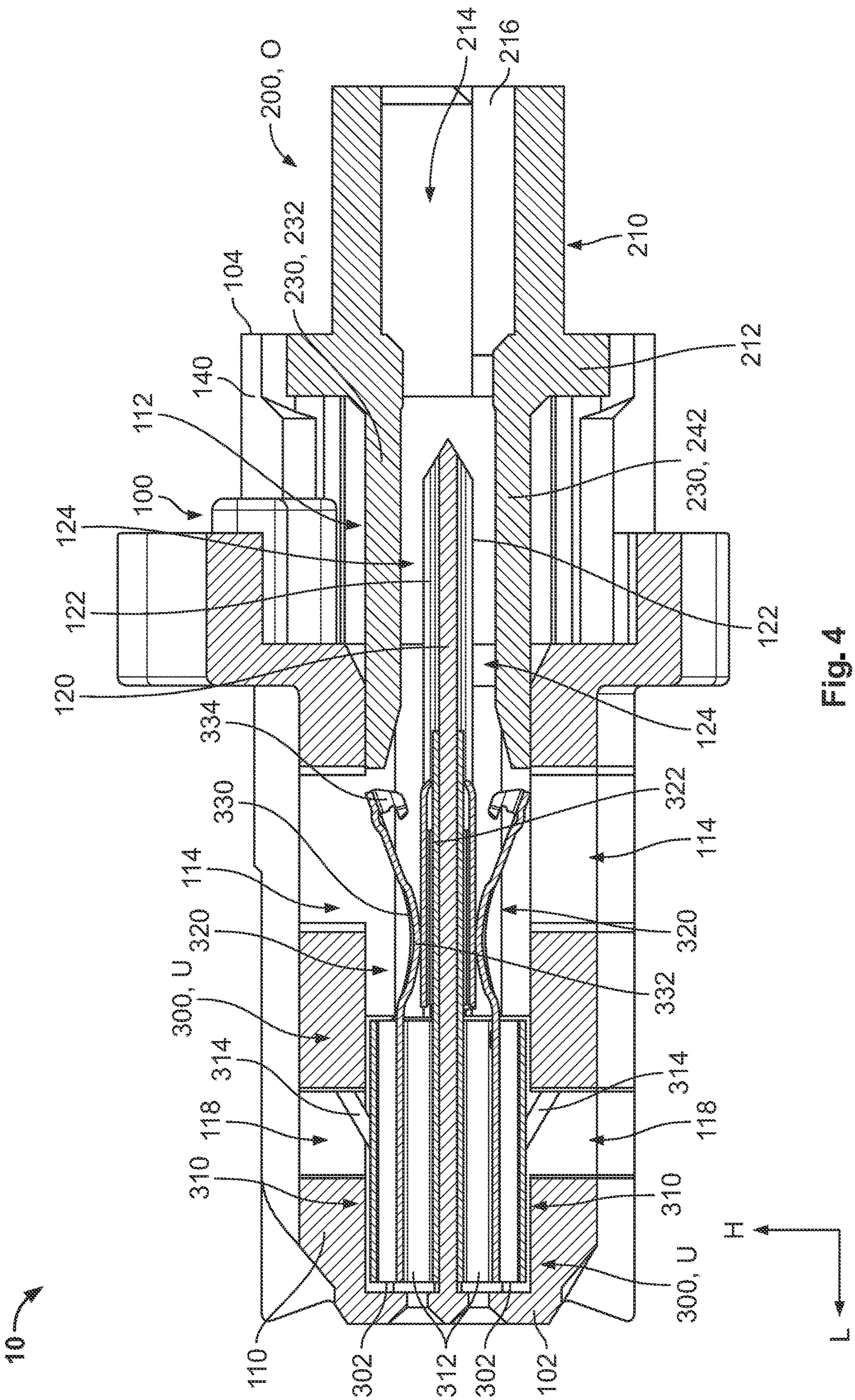
FIG. 4 is a sectional side view of the connector with the locking device in an open position and a terminal in an unterminated state.

The housing 100, as shown in FIGS. 1 and 2, has a first end 102 and a second end 104 opposite the first end 102. The housing 100 has a body 110 extending from the first end 102 and defining a body receiving space 112. The housing 100 has a plurality of termination windows 114, a plurality of sight passageways 116, and a plurality of lance windows 118 extending through the body 110 in a height direction H and communicating with the body receiving space 112. The termination windows 114 and the lance windows 118 extend through each of a pair of opposite sides of the body 110 in the height direction H, as shown in FIG. 4. The sight passageways 116 may extend through one side of the body 110, as shown in FIG. 1, or may extend through each of the pair of opposite sides of the body 110 in the height direction H.

As shown in FIG. 1, the termination windows 114 are aligned in a row with one another along a width direction W perpendicular to the height direction H. The sight passageways 116 are aligned with each other in another row along the width direction W, spaced apart from the termination windows 114 along a longitudinal direction L perpendicular to the height direction H and the width direction W. The lance windows 118 are aligned in an additional row with one another along the width direction W and spaced apart from the termination windows 114 and the sight passageways 116 along the longitudinal direction L. The sight passageways 116 are positioned between the termination windows 114 and the lance windows 118 along the longitudinal direction L.

The size and number of termination windows 114, sight windows 116, and lance windows 118 in the shown embodiment is merely exemplary. The body 110 could have any size and number of termination windows 114, sight windows 116, and lance windows 118 provided the windows 114, 116, 118 serve their respective functions described in greater detail below.

The housing 100 has a divider 120 positioned in the body receiving space 112, as shown in FIG. 2. The divider 120 has a plurality of ridges 122 on opposite sides and defines a plurality of terminal receiving passageways 124 with the body 110, as shown in greater detail in FIGS. 4 and 5. The terminal receiving passageways 124 are arranged in a plurality of rows 126 in the width direction W, shown in FIG. 5, separated from one another in the height direction H. In the shown embodiment, the housing 100 has two rows 126 of terminal receiving passageways 124. In other embodiments, the housing 100 may have three or more rows 126 of terminal receiving passageways 124.

As shown in FIGS. 1 and 2, the housing 100 has a connector latch 130 extending from the body 110 and positioned under a shroud 140 that extends around a portion of the body 110. The shroud 140 is positioned at the second end 104 of the housing 100. In the embodiment shown in FIGS. 2 and 4, the shroud 140 protrudes from the body 110 further than the divider 120 along the longitudinal direction L.

The housing 100, as shown in FIGS. 1 and 2, has a pair of latches 150 extending from the body 110. The latches 150, in the shown embodiment, are each a cantilevered arm that is resiliently deflectable. Each latch 150 has a fixed end connected to the housing 100 and a free end opposite the fixed end along the longitudinal direction. The free end of each of the latches 150 has a hook 152. The latches 150 are positioned on opposite sides of the housing 100 in the width direction W. The latches 150 are at least partially surrounded by the shroud 140, but the shroud 140 does not inhibit deflection of the latches 150. In the shown embodiment, the free end of the latches 150 having the hook 152 extends beyond the second end 104 of the housing 100 at the shroud 140 in the longitudinal direction L.

The housing 100 may be formed of any insulative material, such as any plastic, that is sufficiently rigid to serve as part of a connector 10 but allows resilient deflection of the latches 150. In the shown embodiment, the housing 100 is monolithically formed in a single piece. In other embodiments, the housing 100 may be formed from a number of pieces and assembled together.

Figure 3:
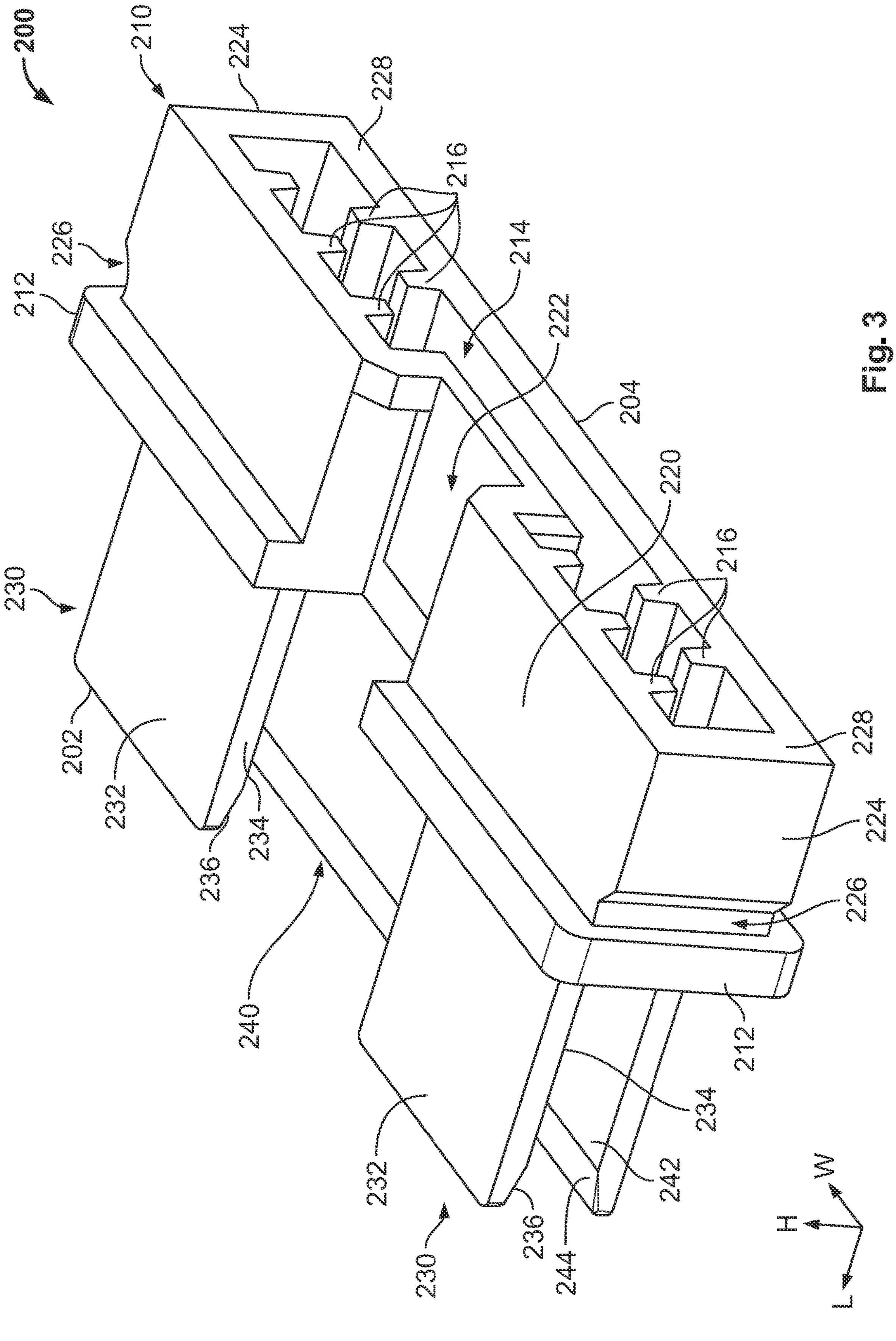
FIG. 3 is a perspective view of a locking device of the connector.

The locking device 200, as shown in FIG. 3, has a first end 202 and a second end 204 opposite the first end 202 along the longitudinal direction L. The locking device 200 has a base 210 and a plurality of protrusions 230 extending from the base 210 along the longitudinal direction L.

As shown in FIG. 3, the base 210 has a flange 212 at an end of the base 210 in the longitudinal direction L, between the base 210 and the protrusions 230. The base 210 defines a base receiving space 214. The base 210 has a plurality of retention elements 216 extending into the base receiving space 214 from opposite sides in the height direction H. Each of the retention elements 216 has an approximately rectangular or trapezoidal shape in the shown embodiment.

The base 210 has an upper surface 220 on an upper side of the base 210 in the height direction H, as shown in FIG. 3. In the shown embodiment, the upper surface 220 has an indent 222 approximately centrally in the width direction W. The base 210 has a pair of side surfaces 224 extending from the upper surface 220 in the height direction H. The side surfaces 224 are positioned opposite one another along the width direction W. As shown in FIG. 3, each of the side surfaces 224 has a groove 226 extending into the side surface 224 adjacent to the flange 212. The base 210 has an end surface 228 facing in the longitudinal direction L and perpendicular to the upper surface 220 and the side surfaces 224. The end surface 228 surrounds an opening of the base receiving space 214.

The protrusions 230 of the locking device 200, as shown in FIG. 3, include a pair of first protrusions 232 and a second protrusion 240. The first protrusions 232 each extend from an upper side of the base 210 in the height direction H adjacent to the flange 212. The first protrusions 232 are separated from one another along the width direction W and each have a first abutting surface 234 extending along the longitudinal direction L and a first chamfer 236 extending at an angle from the first abutting surface 234. The first chamfer 236 is at an end of the first protrusions 232 opposite the base 210 along the longitudinal direction L. The second protrusion 240 extends from a lower side of the base 210 in the height direction H adjacent to the flange 212 and is continuous in a single piece along the width direction W. The second protrusion 240 has a second abutting surface 242 extending along the longitudinal direction L and a second chamfer 244 extending at an angle from the second abutting surface 242. The second abutting surface 242 faces each of the first abutting surfaces 234 in the height direction H. The second abutting surface 242 is angled away from the first abutting surfaces 234.

The locking device 200 may be formed of any insulative material, such as any plastic, that is sufficiently rigid to serve as part of a connector 10. In the shown embodiment, the locking device 200 is monolithically formed in a single piece. In other embodiments, the locking device 200 may be formed from a number of pieces and assembled together.

Each of the terminals 300, as shown in FIG. 4, has a first end 302 and a second end 304 opposite the first end 302 in the longitudinal direction L. Each of the terminals 300 has a connection section 310 at the first end 302 and a spring clip 320 extending from the connection section 310 to the second end 304.

As shown in FIG. 4, the connection section 310 has a pin interface 312 and a locking lance 314 extending from the pin interface 312. The pin interface 312 is capable of receiving and electrically connecting to a contact pin. The locking lance 314 is resiliently deformable.

The spring clip 320 of each of the terminals 300, as shown in FIG. 4, has a first beam 322 and a second beam 330 deflectable with respect to the first beam 322. The second beam 330 has a spring latch 334 at an end opposite the connection section 310 and a contact bend 332 between the connection section 310 and the spring latch 334. The second beam 330 is resiliently deformable. The contact bend 332 is bent toward the first beam 322. The spring latch 334, in an embodiment, has a plurality of L-shaped latch elements with a sharpened end.

In the shown embodiment, each of the terminals 300 is monolithically formed in a single piece from a conductive material. In other embodiments, each of the terminals 300 can be formed from a plurality of separate conductive pieces and assembled together.

Figure 6:
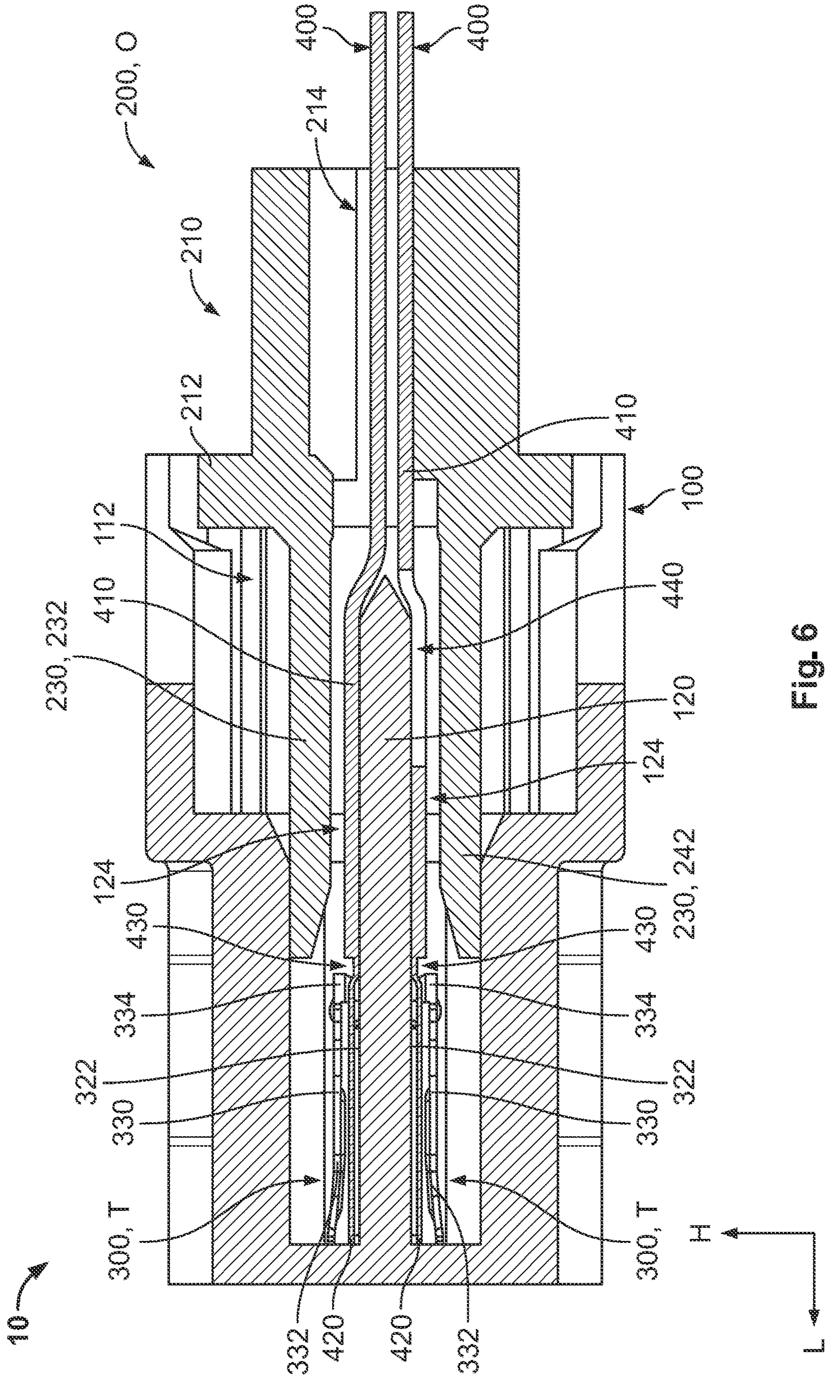
FIG. 6 is a sectional side view of the connector with the locking device in the open position and the terminal in a terminated state connected to a flat flexible cable.

Each of the flat flexible cables (FFCs) 400, as shown in FIG. 6, each include an insulation material 410 and a plurality of flat conductors 420 embedded in the insulation material 410. In an embodiment, the flat conductors 420 are each a metallic foil, such as a copper foil, by way of example only, patterned in any desirable configuration. In another embodiment, the flat conductors 420 could each be formed of an aluminum material. The insulation material 410, such as a polymer insulation material, may be applied to either or both sides of the flat conductors 420 via an adhesive material or extruded directly over the flat conductors 420. The flat conductors 420 may also be referred to as conductors 420 herein.

As shown in FIG. 6, the FFCs 400 have a stripped section 430 in which a portion of the insulation material 410 is removed to expose a side of the conductors 420. The FFCs 400 have a plurality of lock openings 440 extending through the insulation material 410. The lock openings 440 are positioned between the conductors 420 and do not expose the conductors 420.

The assembly and use of the connector 10 will now be described in greater detail primarily with reference to FIGS. 4-8B.

Figure 5:
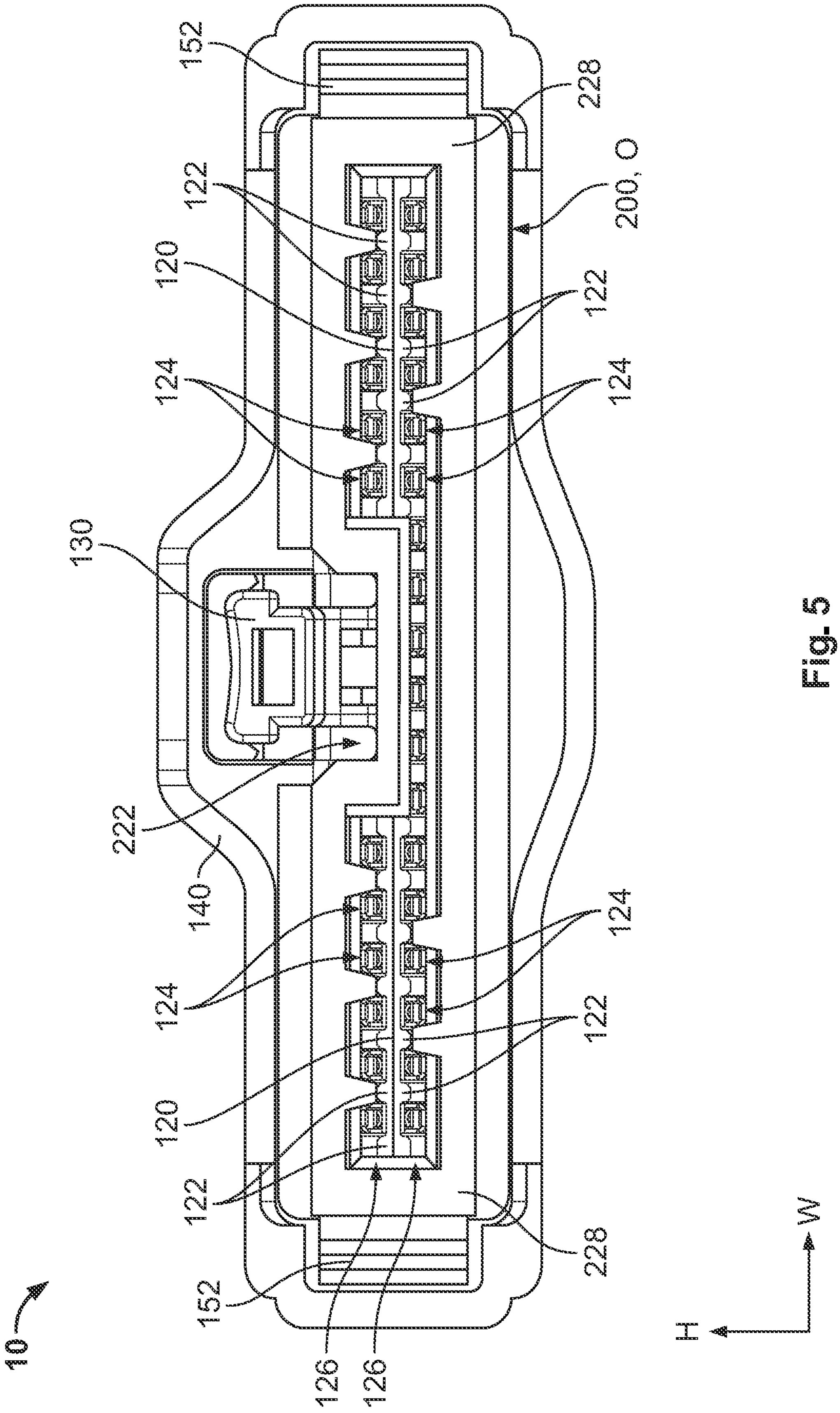
FIG. 5 is a rear view of the connector with the locking device in the open position.

The terminals 300 are first inserted into the housing 100, as shown in FIGS. 4 and 5. Each of the terminals 300 is inserted along the longitudinal direction L into one of the terminal receiving passageways 124 defined by the divider 120, the ridges 122, and the body 110 of the housing 100. The terminals 300 are inserted into the terminal receiving passageways 124 until, as shown in FIG. 4, the locking lance 314 reaches the lance window 118. The locking lance 314 resiliently deflects into the lance window 118 and engages in the lance window 118 to secure the terminal 300 against removal in the longitudinal direction L. The terminals 300 are in an unterminated state U when inserted into the housing 100, as shown in FIG. 4.

When the terminals 300 are each positioned in one of the terminal receiving passageways 124, the locking device 200 is inserted into the housing 100. The protrusions 130 of the locking device 200 are positioned in the body receiving space 112 and the locking device 200 is moved into the housing 100 along the longitudinal direction L. In the embodiment shown in FIGS. 4 and 5, each of the protrusions 130 is received in one of the rows 126 of the housing 100 defined by the divider 120. As shown in FIG. 5, the connector latch 130 is received in the indent 222 of the locking device 200 as the locking device 200 is moved to the open position O.

The locking device 200 is moved along the longitudinal direction L until it reaches an open position O in the housing 100, shown in FIGS. 1, 4, and 5. During insertion of the locking device 200, the locking device 200 contacts the latches 150 and resiliently deflects the latches 150 outward and away from each other along the width direction W. When the locking device 200 reaches the open position O, as shown in FIG. 1, the latches 150 resiliently return from deflection and engage the locking device 200 behind the flange 212. The hook 152 of each of the latches 150 is positioned in one of the grooves 226 adjacent to the flange 212 to engage the flange 212. The open position O is also shown in detail in FIG. 8A, which depicts the engagement of the hooks 152 in the grooves 226. The locking device 200 is secured to the housing 100 in the open position O with each of the terminals 300 in the unterminated state U, as shown in FIG. 4.

In the open position O of the locking device 200 shown in FIGS. 1 and 4-6, the latches 150 engage the locking device 200 and secure the locking device 200 in the open position O. The locking device 200 is movable with respect to the housing 100 in the open position O while remaining secured to the housing 100. For example, the locking device 200 is retained by the latches 150 in the open position O but is movable or floatable with respect to the housing 100 along the height direction H shown in FIGS. 4 and 6 while remaining secured.

The FFCs 400 are inserted into the connector 10 with the locking device 200 in the open position O, as shown in FIG. 6. The FFCs 400 extend through the locking device 200 and into the housing 100 with the locking device 200 in the open position O. As shown in FIG. 6, the FFCs 400 are inserted through the base receiving space 214 of the locking device 200 and into the body receiving space 112 of the housing 100. One FFC 400 is positioned on each side of the divider 120 of the housing 100 in the shown embodiment; each FFC 400 is inserted into one of the rows 126 of terminal receiving passageways 124. The floating of the locking device 200 in the open position O allows for easier insertion of the FFCs 400.

The FFCs 400 are inserted to a position in which the flat conductors 420 are each positioned in one of the terminals 300; between the first beam 322 and the second beam 330 of the spring clip 320 in the unterminated state U. The FFCs 400 are inserted until an end of the insulation material 410 is visible through the sight passageways 116 of the housing 100 shown in FIG. 1.

A tool is then inserted through the termination windows 114 of the housing 100, shown in FIG. 4, to deflect the second beam 330 toward the first beam 322 from the unterminated state U into a terminated state T of the terminal 300 while the locking device 200 remains in the open position O. The compression of the second beam 330 presses the contact bends 332 against the flat conductors 420 to form an electrical connection between each of the flat conductors 420 and one of the terminals 300. As the spring latch 334 is compressed and moves toward the FFC 400 in the height direction H, the sharpened ends of the spring latch 334 pierce the insulation material 410 of the FFC 400 and the spring latch 334 latches to the first beam 322, securing the terminal 300 in the terminated state T shown in FIG. 6. In the terminated state T, each of the terminals 300 is mechanically secured to one of the FFCs 400 and electrically connected to the one of the flat conductors 420.

Figure 7:
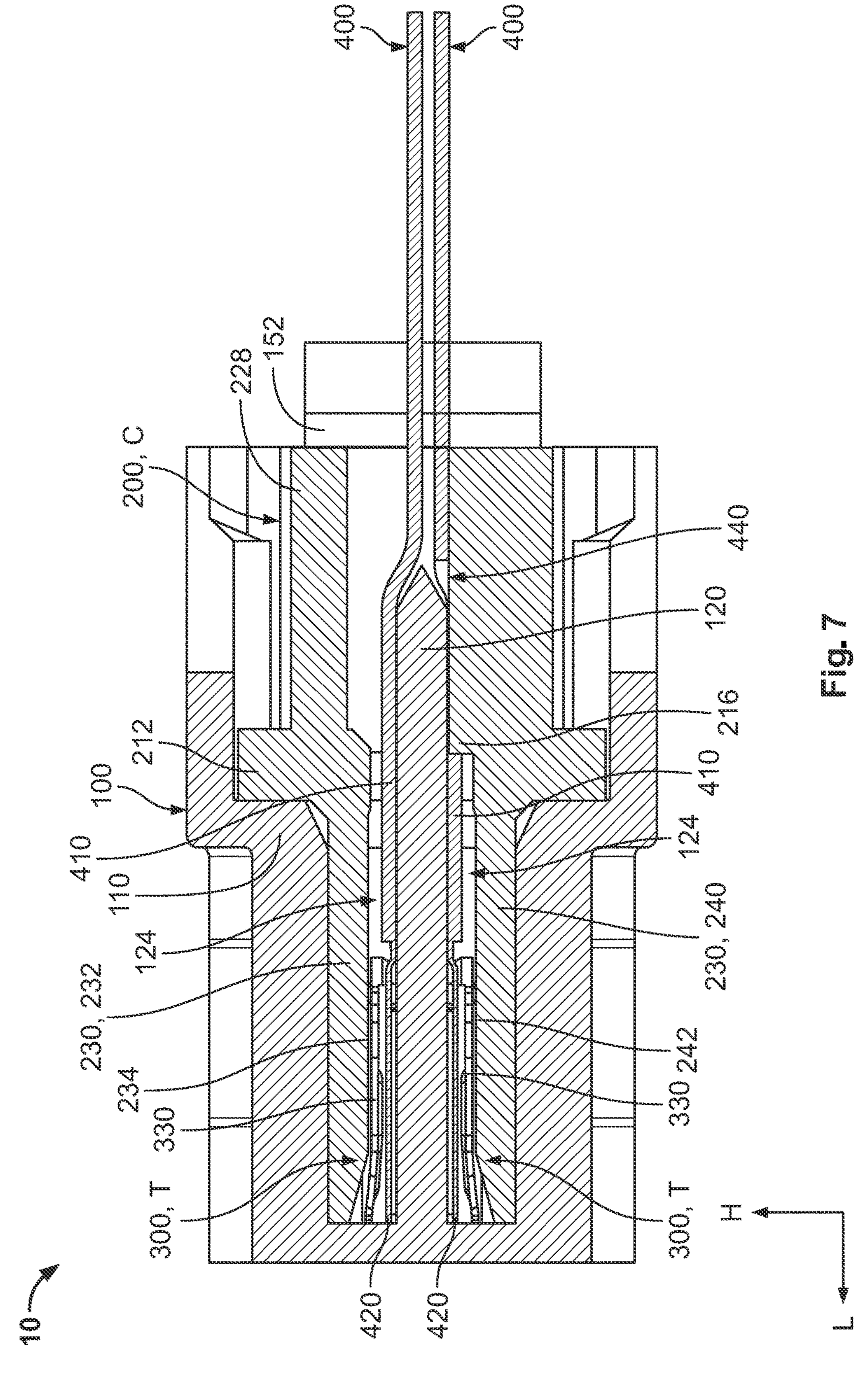
FIG. 7 is a sectional side view of the connector with the locking device in a closed position.
Figure 8B:
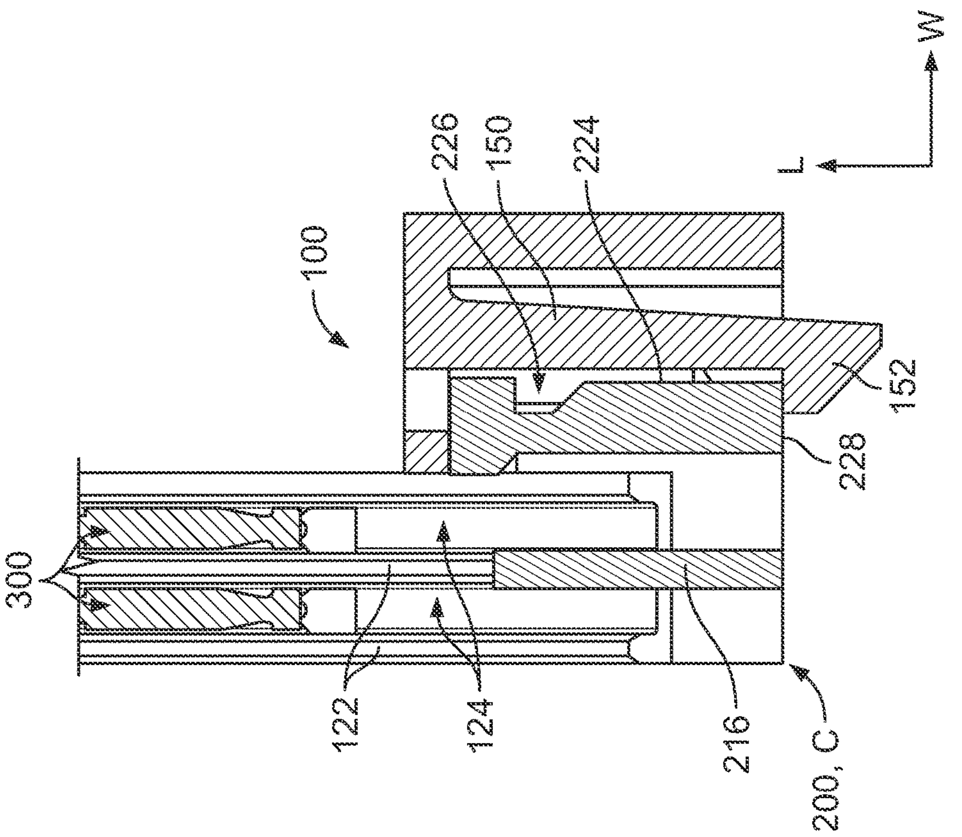
FIG. 8B is a detail, sectional top view of the connector with the locking device in the closed position.
Figure 8A:
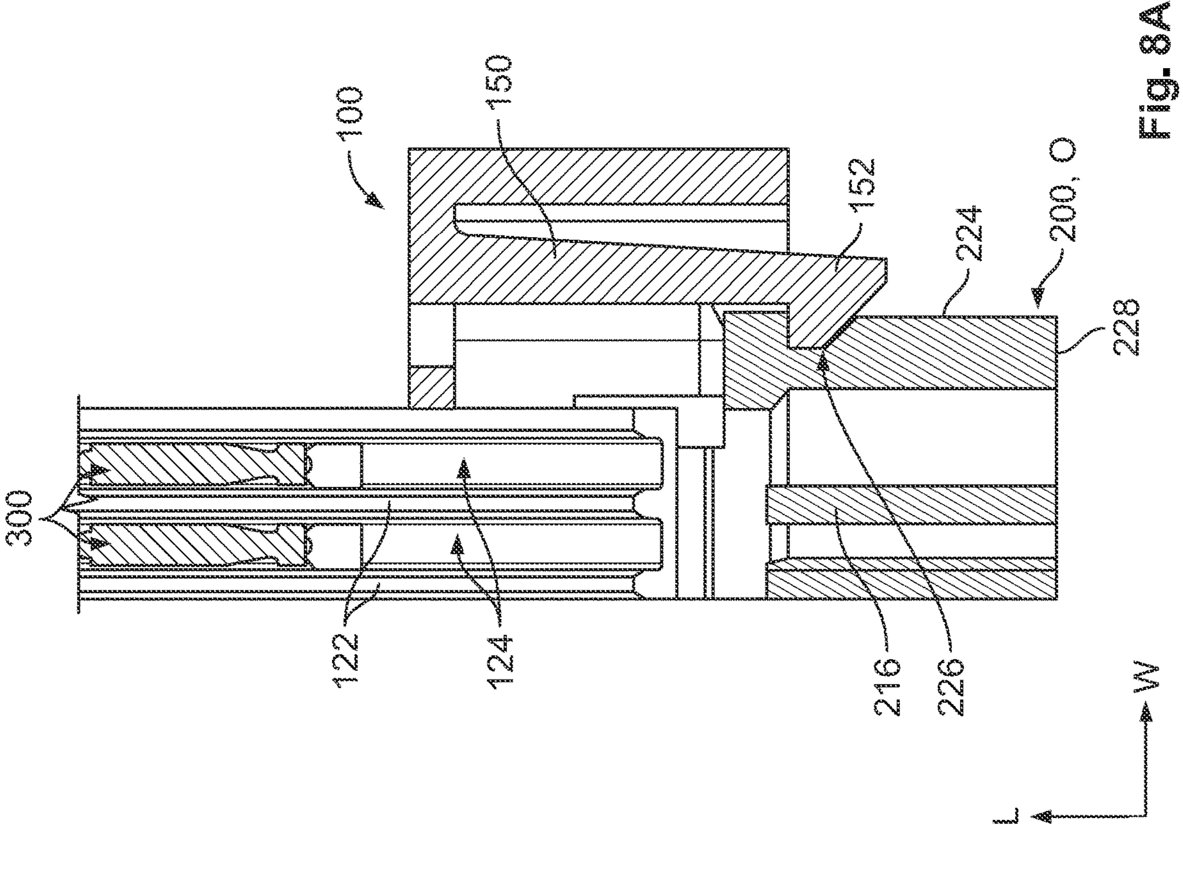
FIG. 8A is a detail, sectional top view of the connector with the locking device in the open position.

With the terminals 300 in the terminated state T and connected to the FFCs 400, the locking device 200 is moved from the open position O to a closed position C shown in FIGS. 7 and 8B. The locking device 200 is moved further into the housing 100 in the longitudinal direction L from the open position O to the closed position C. As the locking device 200 moves from the open position O to the closed position C, the hooks 152 of the latches 150 disengage from the flange 212, resiliently deflect out of the grooves 226, and slide along the side surfaces 224 of the base 210. When the locking device 200 reaches the closed position C, as shown in particular in FIG. 8B, the latches 150 resiliently return and the hooks 152 engage behind the base 210 of the locking device 200, engaging the end surface 228 of the base 210. The latches 150 of the housing 100 engage the locking device 200 and secure the locking device 200 in each of the open position O and the closed position C.

As the locking device 200 moves to the closed position C, the protrusions 230 are inserted further into the terminal receiving passageways 124 along the longitudinal direction L. As shown in FIG. 7, in the closed position C, the protrusions 230 move between the terminals 300 in the terminated state T and the body 110 of the housing 100 in the height direction H. The first abutting surfaces 234 and the second abutting surface 242 abut on the second beam 330 of each of the terminals 300 in the terminated state T to provide a fail-safe, additional support to maintain the electrical connection between the terminals 300 and the flat conductors 420 of the FFCs 400.

In the closed position C, as shown in FIG. 7, the retention elements 216 move into the lock openings 440 of the FFCs 400. The secured position of the retention elements 216 in the lock openings 440 in the closed position C provides additional support to the FFC 400 to resist movement of the insulation material 410 by, for example, a pulling force on the FFC 400.

The connector 10 of the invention is not restricted to the embodiments shown in FIGS. 1-8B. In another embodiment, for example, the terminals 300 may be have only a flat web tab instead of the spring clip 320. In this embodiment, each of the protrusions 230 has a window opening extending through the protrusion 230 in the height direction H and, in the closed position C, the flat conductors 420 are welded to the weld tabs of the terminals 300 through the termination windows 114 and the window openings of the protrusions 230.

In the connector 10 according to the embodiments described herein, the securing of the locking device 200 by the latches 150 in the open position O of the locking device 200 allows for easier insertion of the FFCs 400 without risking separation of the locking device 200 and the housing 100. Further, in the closed position C, the securing of the locking device 200 by the same latches 150 provides support that keeps the terminals 300 in the terminated state T and provides additional support to resist forces on the FFCs 400, maintaining a more reliable and robust connection in the connector 10. The connector 10, in an embodiment, also simultaneously accomplishes these advantages in two rows 126 of terminals 300 connected to multiple FFCs 400.

What is claimed is:

1. A connector, comprising:

a housing having a body defining a body receiving space, a divider positioned in the body receiving space and defining a plurality of terminal receiving passageways with the body in a plurality of rows, and a latch extending from the body; and a locking device received within the housing in an insertion direction, the locking device having a base and a plurality of protrusions extending from the base, each of the protrusions is received in one of the rows in an open position of the locking device and is inserted further into the terminal receiving passageways in the insertion direction in a closed position of the locking device, the latch engages the locking device to secure the locking device in each of the open position and the closed position and prevent movement of the locking device relative to the housing in a direction opposite the insertion direction in each of the open position and the closed position.

2. The connector of claim 1, wherein, in the open position, the locking device is movable with respect to the housing in at least one direction transverse to the insertion direction while remaining secured to the housing.

3. The connector of claim 1, wherein the locking device has a flange extending from the base, the latch engages the flange in the open position of the locking device.

4. The connector of claim 3, wherein the locking device has a groove on a surface adjacent to the flange, the latch is positioned in the groove in the open position of the locking device.

5. The connector of claim 3, wherein the latch engages an end surface of the base in the closed position of the locking device.

6. A connector, comprising:

a housing having a body defining a body receiving space and a plurality of lance windows extending therethrough, a divider positioned in the body receiving space and defining a plurality of terminal receiving passageways with the body in a plurality of rows, and a latch extending from the body;

a locking device having a base and a plurality of protrusions extending from the base, each of the protrusions is received in one of the rows in an open position of the locking device and is inserted further into the terminal receiving passageways in a closed position of the locking device, the latch engages the locking device to secure the locking device in each of the open position and the closed position; and a plurality of terminals each positioned in one of the terminal receiving passageways, the locking device is secured to the housing in the open position with each of the terminals in an unterminated state, each of the terminals having a locking lance engaged in one of the lance windows to secure the terminals in the terminal receiving passageways.

7. The connector of claim 6, further comprising a flat flexible cable extending through the locking device and into the housing with the locking device in the open position, the flat flexible cable has an insulation material and a plurality of flat conductors embedded in the insulation material.

8. The connector of claim 7, wherein the body of the housing has a plurality of sight passageways extending through the body, the flat flexible cable is inserted into the housing until the insulation material is visible through the sight passageways.

9. The connector of claim 7, wherein the body of the housing has a plurality of termination windows extending through the body, each of the terminals is mechanically and electrically connected to one of the flat conductors in a terminated state through the termination windows.

10. The connector of claim 9, wherein each of the terminals has a spring clip with a first beam and a second beam deflectable with respect to the first beam, the second beam is deflected toward the first beam in the terminated state.

11. The connector of claim 10, wherein the second beam has a spring latch piercing the insulation material and engaging the first beam in the terminated state.

12. The connector of claim 6, wherein, in the closed position of the locking device, the protrusions of the locking device abut the terminals and are positioned between the terminals and the body of the housing in a terminated state of the terminals.

13. The connector of claim 7, wherein the base of the locking device has a retention element extending into a base receiving space through which the flat flexible cable is inserted.

14. The connector of claim 13, wherein the flat flexible cable has a lock opening extending through the insulation material.

15. The connector of claim 14, wherein the retention element is positioned in the lock opening in the closed position of the locking device.

16. A method of terminating a flat flexible cable, comprising:

providing a connector including a housing and a locking device, the housing having a body defining a body receiving space, a divider positioned in the body receiving space and defining a plurality of terminal receiving passageways with the body in a plurality of rows, and a latch extending from the body, the locking device having a base and a plurality of protrusions extending from the base;

inserting the locking device into the housing to an open position in which the protrusions are each received in one of the rows;

inserting a flat flexible cable through the locking device in the open position and into one of the rows of the connector; and inserting the locking device further into the housing to a closed position, the latch engages and secures the locking device in each of the open position and the closed position.

17. The method of claim 16, further comprising inserting a plurality of terminals in an unterminated state into the connector prior to inserting the locking device, the terminals remain in the unterminated state with the locking device in the open position.

18. The method of claim 17, wherein the terminals are terminated to a plurality of flat conductors of the flat flexible cable in a terminated state with the locking device in the open position.

19. The method of claim 18, wherein the locking device in the closed position secures the terminals in the terminated state and secures the flat flexible cable in the housing.

20. A connector, comprising:

a housing having a body defining a body receiving space, a divider positioned in the body receiving space and defining a plurality of terminal receiving passageways with the body in a plurality of rows, and a latch extending from the body;

a locking device having a base and a plurality of protrusions extending from the base, each of the protrusions is received in one of the rows in an open position of the locking device and is inserted further into the terminal receiving passageways in a closed position of the locking device, the latch engages the locking device to secure the locking device in each of the open position and the closed position; and a flat flexible cable extending through the locking device and into the housing with the locking device in the open position, the flat flexible cable has an insulation material and a plurality of flat conductors embedded in the insulation material.

* * * * *